(No Model.)
O. C. LITTLE.
COLLAR.
No. 483,228.        Patented Sept. 27, 1892.
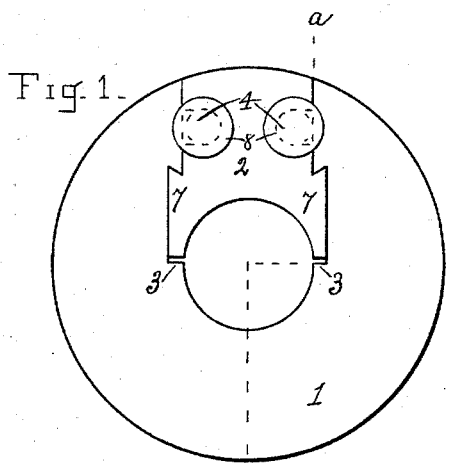
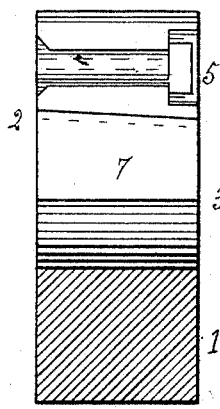
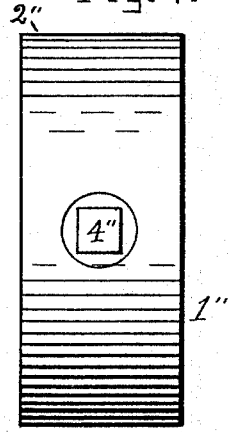
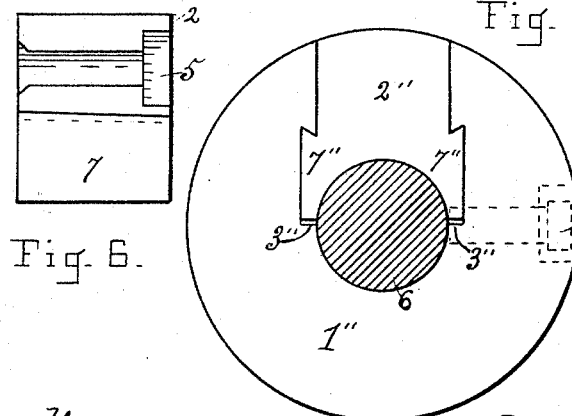
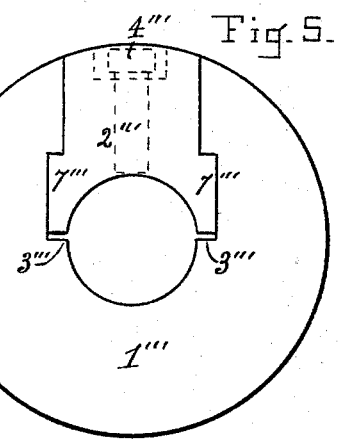
Witnesses:
Harry De Wolf
Jos. L. Sweeger
Inventor:
Orton C. Little
By his Atty. G. H. Albee.

UNITED STATES PATENT OFFICE.

ORTON C. LITTLE, OF MENASHA, WISCONSIN, ASSIGNOR OF ONE-HALF TO DUNCAN T. H. MacKINNON, OF SAME PLACE.

COLLAR.

SPECIFICATION forming part of Letters Patent No. 483,228, dated September 27, 1892.

Application filed April 4, 1892. Serial No. 427,584. (No model.)

*To all whom it may concern:*

Be it known that I, ORTON C. LITTLE, a citizen of the United States, residing at Menasha, in the county of Winnebago and State of Wisconsin, have invented a new and useful Improvement in Collars, of which the following is a specification.

My invention relates to a collar for use upon shafting for the purpose of preventing endwise movement thereof, and has for its object the providing of one that can be quickly applied or removed from a shaft and one that can be applied in places between a pulley and shaft bearing or a similar place and without removing the pulley from the shaft for the purpose of applying said collar, and that can also be firmly and quickly secured against great endwise pressure. I accomplish said objects by the construction shown in the accompanying drawings, in which—

Figure 1 is an end elevation of my invention; Fig. 2, a vertical section upon the line *a a* of Fig. 1 as it is seen in looking toward the left; Fig. 3, an end elevation showing a modification in the manner of applying a bolt for securing the parts together; Fig. 4, a side elevation of Fig. 3; Fig. 5, another modification showing a different form to the removable part by inserting a bolt, and Fig. 6 a side elevation of the removable part as it is shown in Fig. 1.

Similar figures of reference indicate like parts in the several views.

1 indicates the body or main portion of the collar in Figs. 1 and 2, 1'' in Figs. 3 and 4, and 1''' in Fig. 5.

2 indicates the removable part of the collar in Figs. 1 and 2, 2'' in Figs. 3 and 4, and 2''' in Fig. 5.

3 indicates the recesses into which the removable part of the collar is fitted in Figs. 1 and 2, 3'' in Figs. 3 and 4, and 3''' in Fig. 5.

4 indicates the bolts in Fig. 1, 4'' in Figs. 3 and 4, and 4''' in Fig. 5.

5 indicates bolt-recesses in Figs. 2 and 6.

6 indicates a shaft in Fig. 3.

7 indicates wings upon the removable blocks in Figs. 1 and 2, 7'' in Fig. 3, and 7''' in Fig. 5.

The collar consists, as will be seen in Figs. 1, 3, and 5, of a main part, which constitutes the larger portion of it and having a shaft-opening from its bore outward slightly wider than said bore, so as to permit the application of the collar to a shaft. At each side of its bore and longitudinally with it are recesses 3 3'' in Figs. 1, 2, and 3, the bottom sides of which are a diametrical plane of their respective bores, their back or outer sides planes at right angles with said bottom sides, and their upper sides planes which lie at an acute angle with both the bottom and outer sides of said recesses in both a transverse and longitudinal direction. This arrangement of the planes, which bound three sides of said recesses, produces in Figs. 1 and 2 recesses of gradually-decreasing area from one end of the collar to the other.

The block 2 is provided with a wing on two of its sides, which are fitted for entering the recesses 3 in the main portion 1 of the collar, as shown in Fig. 1. A thin piece of packing should be inserted between the bottom of said wings and the bottom of the recesses and the block driven in tightly. The bolts 4, the heads 8 of which are countersunk into the pieces 1 and 2, are then inserted and their nuts screwed up, when the collar may be bored to the required diameter, placed upon a mandrel, and its outside and ends turned and finished in a usual and well-known manner. By removing the nuts from the bolts the removable part may be driven out, when the collar may be placed upon a shaft, the block 2 replaced, the bolts inserted and their nuts screwed up, and the collar thereby firmly secured upon the shaft.

In Fig. 5 a modification is shown in the form of the recesses within which the wings of the detachable portion 2'''' of the collar are wedged. The wedge form of the wings 7'''' of the block 2''' and of the upper side of the recesses 3''' of the collar 1''' is the same longitudinally of the bore of the collar as is given to the wings of the block 2 and to the upper side of the recesses 3 in the collar 1, as is represented by the heavy line at the upper edge of said wing in Fig. 2; but the half-dovetail feature which is shown in Figs. 1 and 3 is omitted, and instead of it a square corner is presented at said upper edge. It will be noticed, however, that by reason of this wedge form of the wings and recesses the same result will be produced by driving the block into the opening in the collar in Fig. 5 as will be by driving the block belonging thereto into the half-dovetail recesses of Figs. 1 and 3—that is, the removable block 2''' will be wedged down upon the shaft upon which the collar may be applied in the same manner as the block 2 will be in Figs. 1 and 2. The bolts 4 are for retaining the block 2 within the opening in the collar when inserted therein, and may also be used to draw the block inward and to compress it more tightly upon the shaft to which the collar may be applied. The bolt 4' may also be used for drawing the blocks 2' together, as well as for holding them when driven in. The bolt 4'' in Figs. 3 and 4 is tapped into the collar, its inner end extending through the block 2'' and bearing upon the shaft 6, the hole in the block through which the bolt passes being sufficiently large so that the block can have some movement longitudinally of the bore of the collar for the purpose of driving the block in and wedging it tightly down upon the shaft and still have the bolt retain the block from working entirely out of the collar. The bolt 4''' in Fig. 5 is tapped into the block 2''', and, like the bolt 4'', above referred to, is for retaining the block within the opening and is to be screwed down until it bears upon the shaft. Any one of the methods shown for applying the bolt or bolts for retaining the block or blocks within the opening in the collar may be used as the particular location of the collar may require. The taper which is given to the wings and recesses being so slight, when the blocks are driven into the opening and wedged down upon the shaft little, if anything, is necessary for holding them in the desired position. While this form may be used with some degree of success for connecting the two parts of the collar, the form shown in Figs. 1 and 3 is preferable, for the reason that the driving inward of the part 2''' in Fig. 5 tends to spread the sides of the opening and the lower half of the bore outward from the shaft to which it may be applied, while in the preferred form, as shown in Figs. 1 and 3, said act of driving draws said sides inward and compresses them upon the shaft, thereby strengthening instead of weakening the collar.

Having described my invention, what I claim, and desire to secure by Letters Patent, is—

A separable collar having its main portion which is adjacent the bore provided with an opening slightly wider than said bore, said opening having upon each side thereof outward from the axial line of said collar recesses whose bottom sides are a diametrical plane of said collar, their back or outer sides planes lying parallel with the bore of the collar and at right angles with the diametrical plane aforesaid, and their upper sides planes lying at such an angle with the aforesaid sides as to form recesses of a gradually-decreasing area from one end of the collar to the other, a block having wings on two sides thereof corresponding with said recesses and being adapted to be driven into said opening and to clamp the collar upon a shaft, and a bolt or bolts for retaining said block therein, substantially as described.

ORTON C. LITTLE.

Witnesses:
   HENRY HEWETT, Sr.,
   HARRY DE WOLF.